(12) United States Patent
Mou et al.

(10) Patent No.: US 11,525,439 B2
(45) Date of Patent: Dec. 13, 2022

(54) ACTUATING AND SENSING MODULE

(71) Applicant: Microjet Technology Co., Ltd., Hsinchu (TW)

(72) Inventors: Hao-Jan Mou, Hsinchu (TW); Shih-Chang Chen, Hsinchu (TW); Jia-Yu Liao, Hsinchu (TW); Hung-Hsin Liao, Hsinchu (TW); Chung-Wei Kao, Hsinchu (TW); Chi-Feng Huang, Hsinchu (TW); Yung-Lung Han, Hsinchu (TW); Chang-Yen Tsai, Hsinchu (TW); Yang Ku, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 105 days.

(21) Appl. No.: 17/230,058

(22) Filed: Apr. 14, 2021

(65) Prior Publication Data

US 2021/0332810 A1    Oct. 28, 2021

(30) Foreign Application Priority Data

Apr. 24, 2020 (TW) ................................. 109113928

(51) Int. Cl.
*F04B 43/04* (2006.01)
*F16K 7/00* (2006.01)
(Continued)

(52) U.S. Cl.
CPC ........ *F04B 43/046* (2013.01); *F04B 43/0081* (2013.01); *F04B 49/03* (2013.01); *F16K 7/00* (2013.01); *G01F 1/34* (2013.01)

(58) Field of Classification Search
CPC .... F04B 43/046; F04B 43/0081; F04B 49/03; F04B 49/035; F16K 7/00; G01F 1/34; G01F 1/383; G01F 1/363; G01L 7/08–088
See application file for complete search history.

(56) References Cited

U.S. PATENT DOCUMENTS 7,765,872 B2 *  8/2010  Morales .................... G01F 1/48
                                                73/706
7,878,074 B1 *  2/2011  Shapiro ................... G01F 1/383
                                                73/861.61
(Continued)

FOREIGN PATENT DOCUMENTS

JP    2008-537057 A    9/2008
JP    2009-150329 A    7/2009
(Continued)

*Primary Examiner* — Devon C Kramer
*Assistant Examiner* — Joseph S. Herrmann
(74) *Attorney, Agent, or Firm* — Birch, Stewart, Kolasch & Birch, LLP

(57) ABSTRACT

An actuating and sensing module is disclosed and includes a bottom plate, terminals, a control chip, a partition plate, a gas pressure sensor, a thin gas transportation device and a cover plate. The bottom plate includes terminal grooves, a recess, a gas outlet and a gas relief aperture. The terminals are disposed in the terminal grooves. The control chip is disposed in the recess. The partition plate is stacked on the bottom plate and includes an outlet opening in communication with the gas outlet and a pressure relief orifice corresponding to the gas relief aperture. The thin gas transportation device seals the gas outlet and the pressure relief orifice. The cover plate includes an opening passed through by the thin gas transportation device. The gas is transported to the outlet opening by the thin gas transportation device and sensed by the gas pressure sensor disposed in the outlet opening.

15 Claims, 19 Drawing Sheets

(51) Int. Cl.
*G01F 1/34* (2006.01)
*F04B 43/00* (2006.01)
*F04B 49/03* (2006.01)

(56) References Cited

U.S. PATENT DOCUMENTS

| | | | |
|---|---|---|---|
| 2013/0008263 A1* | 1/2013 | Kabasawa | G01F 1/6845 73/861 |
| 2017/0215744 A1* | 8/2017 | Kawamura | A61B 5/0235 |
| 2017/0218936 A1* | 8/2017 | Chen | F16K 99/0015 |
| 2018/0368704 A1* | 12/2018 | Kawamura | F16K 7/00 |
| 2020/0355180 A1* | 11/2020 | Tanaka | F04B 45/047 |

FOREIGN PATENT DOCUMENTS

| | | |
|---|---|---|
| TW | 201826468 A | 7/2018 |
| TW | 201916899 A | 5/2019 |

\* cited by examiner

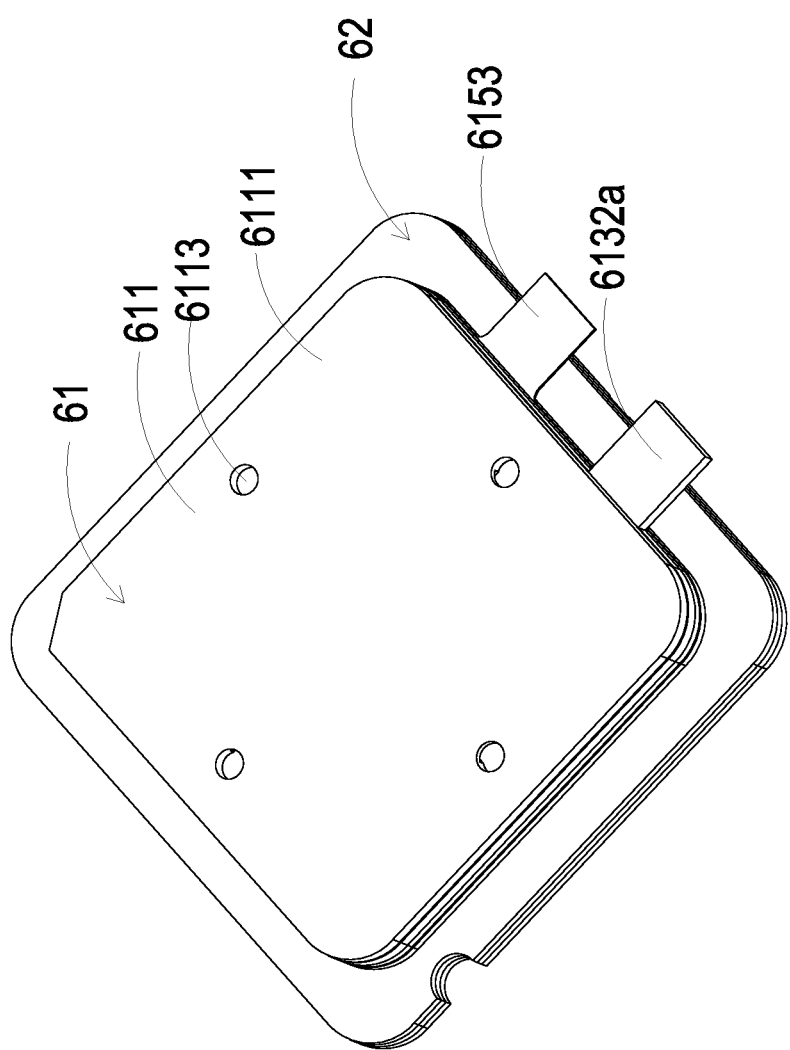

ACTUATING AND SENSING MODULE

FIELD OF THE INVENTION

The present disclosure relates to an actuating and sensing module, and more particularly to an actuating and sensing module capable of being connected with a positive pressure load and a negative pressure load and regulating gas transportation.

BACKGROUND OF THE INVENTION

With the rapid advancement of science and technology, the application of gas transportation device tends to be more and more diversified in industrial applications, biomedical applications, healthcare, electronic cooling and so on, even in the wearable devices that become popular recently. It is obviously that the conventional pumps gradually tend to miniaturize the structure and maximize the flow rate thereof.

The current thin gas transportation device is often used to inflate a positive pressure load or deflate a negative pressure load. However, it is difficult to regulate the inflation and deflation of the thin gas transportation device. Therefore, there is a need to provide an actuating and sensing module to achieve the purposes of miniaturizing the volume thereof, simplifying the combination with a positive pressure load or a negative pressure load, and regulating the efficiency of inflation or deflation thereof.

SUMMARY OF THE INVENTION

An object of the present disclosure is to provide an actuating and sensing module capable of being connected to a positive pressure load and a negative pressure load, which is a miniaturized actuating and sensing module capable of regulating upon the operations of inflating the positive pressure load and deflating the negative pressure load.

In accordance with an aspect of the present disclosure, an actuating and sensing module is provided. The actuating and sensing module includes a bottom plate, at least one terminal, a control chip, a partition plate, a gas pressure sensor, a thin gas transportation device and a cover plate. The bottom plate includes at least one terminal groove, a recess, a gas outlet and a gas relief aperture. The terminal is disposed in the at least one terminal groove. The control chip is disposed in the recess. The partition plate is stacked on the bottom plate and includes an outlet opening and a pressure relief orifice. The outlet opening is in fluid communication with the gas outlet, and the pressure relief orifice is corresponding to the gas relief aperture. The gas pressure sensor is accommodated in the outlet opening. The thin gas transportation device is disposed on the partition plate and seals the gas outlet and the pressure relief orifice. The cover plate is disposed on the partition plate and includes an opening for the thin gas transportation device to pass through. The gas is transported to the outlet opening by the thin gas transportation device, and the change of pressure and flow rate of the gas can be sensed by the gas pressure sensor disposed in the outlet opening.

BRIEF DESCRIPTION OF THE DRAWINGS

The above contents of the present disclosure will become more readily apparent to those ordinarily skilled in the art after reviewing the following detailed description and accompanying drawings, in which:

FIG. 2 is a schematic view illustrating the thin gas transportation device according to the embodiment of the present disclosure;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
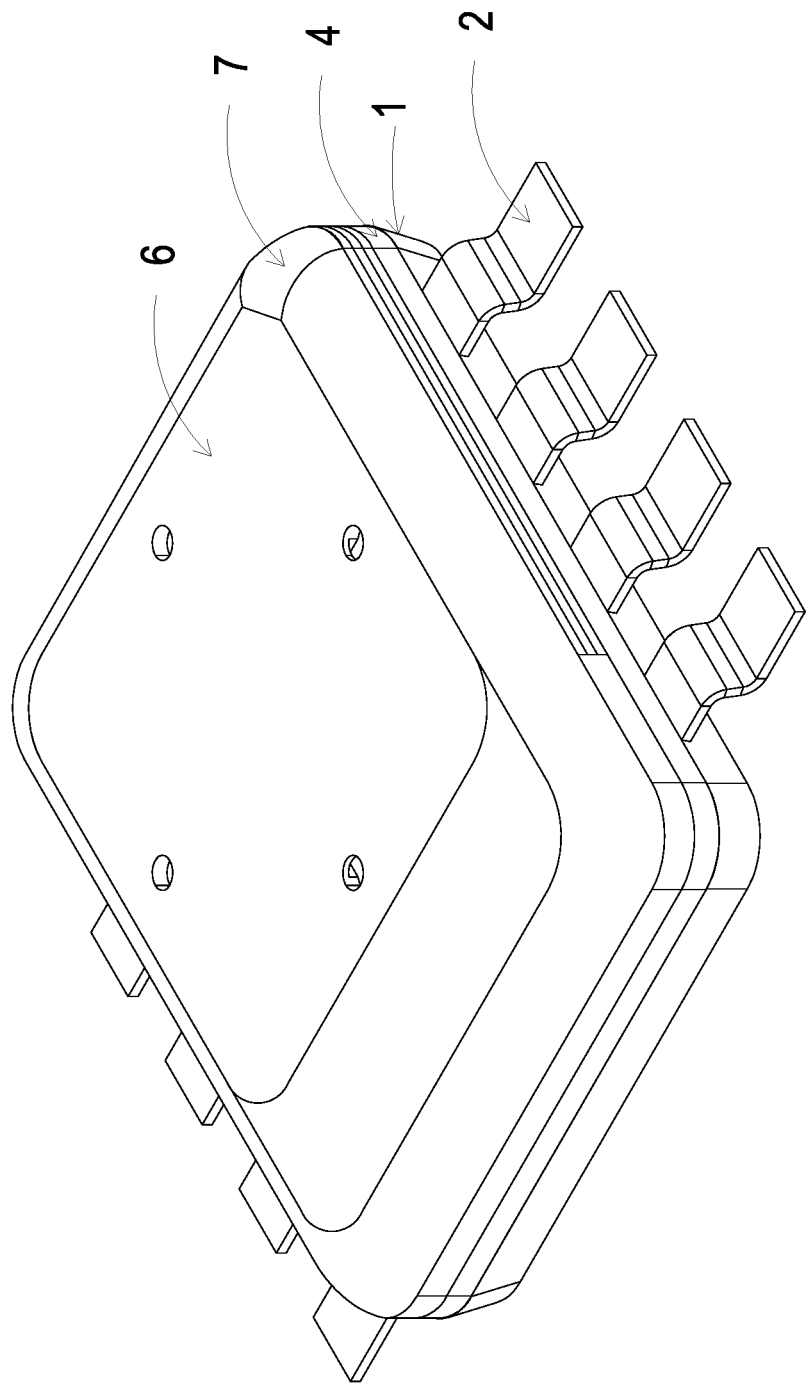
FIG. 1A is a schematic view illustrating an actuating and sensing module according to an embodiment of the present disclosure.
Figure 1B:
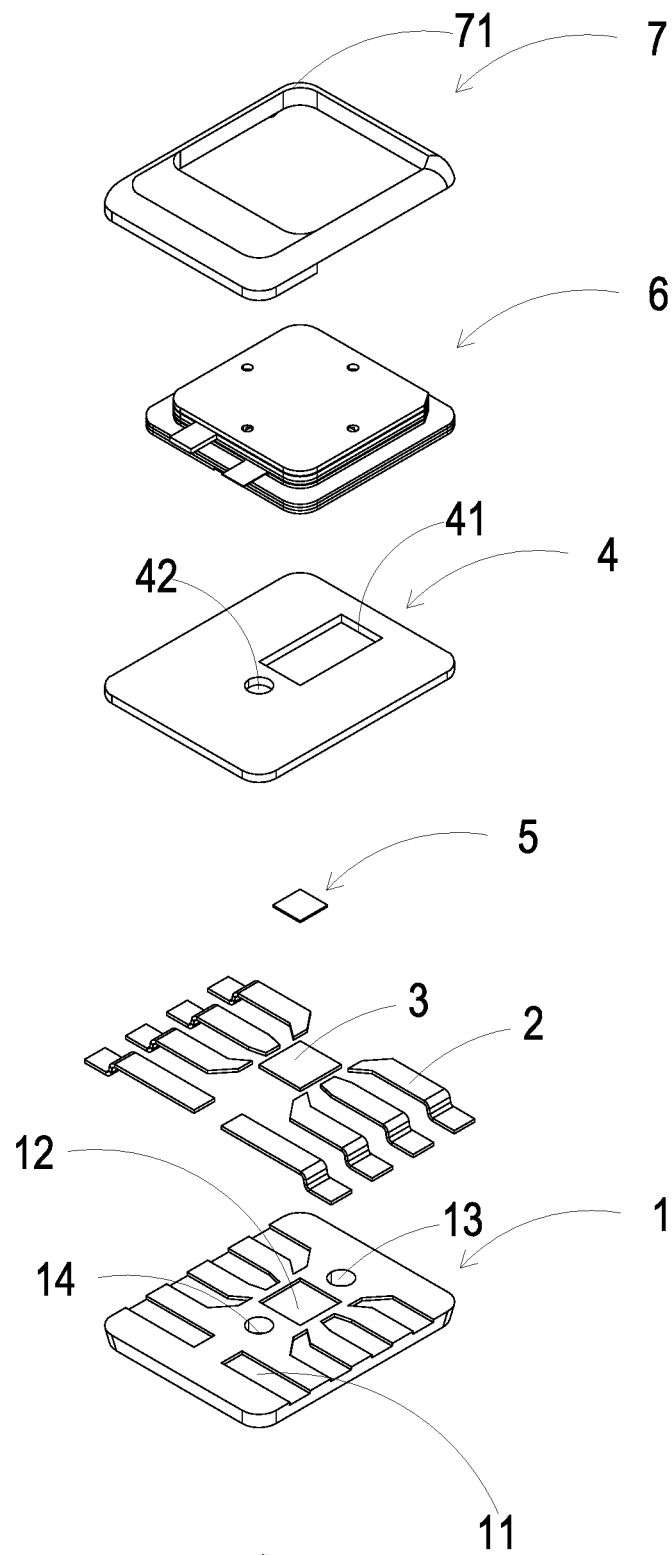
FIG. 1B is an exploded view illustrating the actuating and sensing module according to the embodiment of the present disclosure.

The present disclosure provides an actuating and sensing module 100, which is applicable for a mobile phone, a tablet computer, a wearable device or any similar mobile electronic device including components such as a microprocessor and RAM. Please refer to FIG. 1A and FIG. 1B, which are schematic views illustrating an actuating and sensing module according to an embodiment of the present disclosure. In the embodiment, the actuating and sensing module 100 includes a bottom plate 1, at least one terminal 2, a control chip 3, a partition plate 4, a gas pressure sensor 5, a thin gas transportation device 6 and a cover plate 7.

In the embodiment, the bottom plate 1 includes at least one terminal groove 11, a recess 12, a gas outlet 13 and a gas relief aperture 14. In the embodiment, the bottom plate 1 includes eight terminal grooves 11, and the eight terminal grooves 11 are arranged on the two sides of the bottom plate 1, respectively, but not limited thereto. The gas outlet 13 and the gas relief aperture 14 are separated from each other. The recess 12 is located between the gas outlet 13 and the gas relief aperture 14. The terminal 2 is spatially corresponding to the terminal grooves 11. In the embodiment, the actuating and sensing module 100 includes eight terminals 2, and the eight terminals 2 are accommodated in the terminal grooves 11, respectively. The control chip 3 is accommodated in the recess 12 and electrically connected with the terminals 2 by a wire bonding method (not shown). In that, the control chip 3 is electrically connected with the outside through the terminals 2. The partition plate 4 is stacked on the bottom plate 1 and includes an outlet opening 41 and a pressure relief orifice 42. The outlet opening 41 is located above the gas outlet 13 and the recess 12 and in fluid communication therewith. The pressure relief orifice 42 is correspondingly disposed above the gas relief aperture 14 and in fluid communication therewith. The gas pressure sensor 5 is accommodated in the outlet opening 41, located above the control chip 3 and electrically connected therewith for sensing a pressure and a flow rate of the gas transported through the outlet opening 41. The thin gas transportation device 6 is disposed on the partition plate 4 and seals the outlet opening 41 and the pressure relief orifice 42. The cover plate 7 is disposed on the partition plate 4 and includes an opening 71 for the thin gas transportation device 6 to pass therethrough. When the thin gas transportation device 6 enables the operation, the gas is inhaled into the outlet opening 41, and the gas pressure sensor 5 disposed in the outlet opening 41 senses the pressure and the flow rate of the gas transported through the outlet opening 41.

Please refer to FIG. 2. In the embodiment, the thin gas transportation device 6 includes a thin gas pump 61 and a thin valve structure 62. The thin gas pump 61 is stacked on the thin valve structure 62.

Figure 3A:
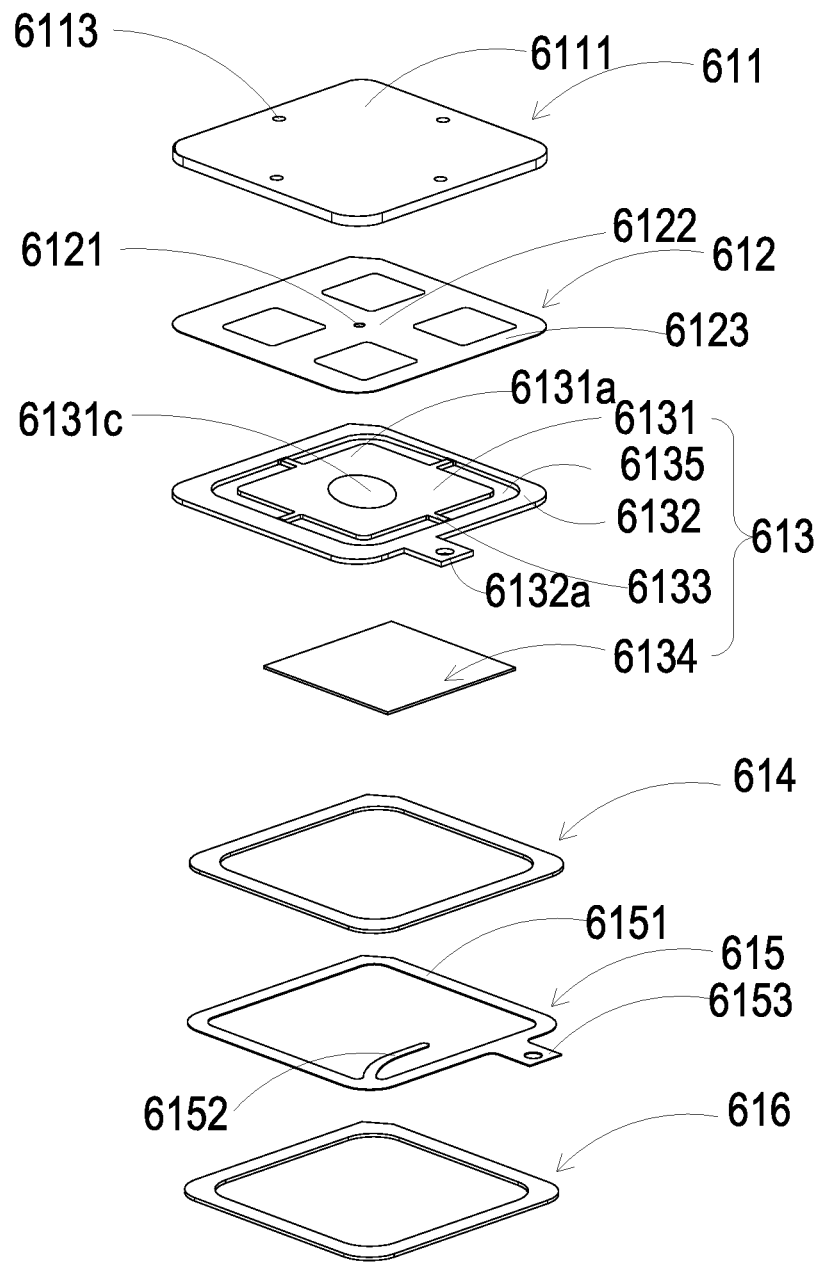
FIG. 3A is an exploded view illustrating the thin gas pump according to the embodiment of the present disclosure.
Figure 3B:
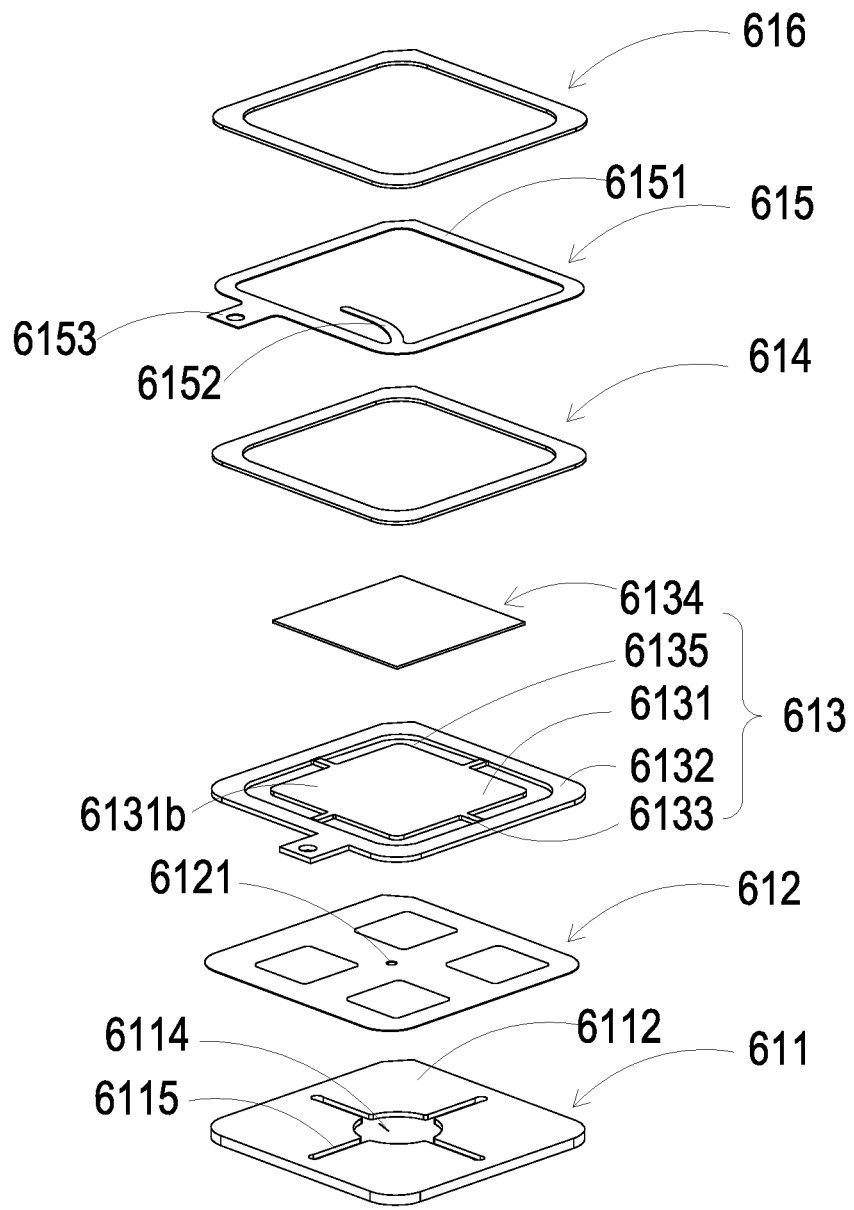
FIG. 3B is an exploded view illustrating the thin gas pump according to the embodiment of the present disclosure and taken from a different perspective.

Please refer to FIG. 3A and FIG. 3B. In the embodiment, the thin gas pump 61 includes an inlet plate 611, a resonance plate 612, an actuation element 613, a first insulation frame 614, a conducting frame 615, and a second insulation frame 616. The inlet plate 611 includes a first surface 6111, a second surface 6112, a plurality of inlet apertures 6113, a convergence chamber 6114 and a plurality of intake channels 6115. The first surface 6111 and the second surface 6112 are two surfaces opposed to each other. In the embodiment, preferably but not exclusively, the number of the plurality of inlet apertures 6113 is exemplified by four, but not limited thereto. Each one of the plurality of inlet apertures 6113 penetrates from the first surface 6111 to the second surface 6112. The convergence chamber 6114 is recessed from the second surface 6112 and located at a center of the second surface 6112. The number and the position of the plurality of intake channels 6115 are corresponding to those of the plurality inlet apertures 6113. In the embodiment, preferably but not exclusively, the number of the plurality of intake channels 6115 is exemplified by four. Each of the plurality of intake channels 6115 is recessed from the second surface 6112 and includes a first end in fluid communication with the corresponding inlet aperture 6113 and a second end in fluid communication with the convergence chamber 6114. In that, when the gas is inhaled through the inlet apertures 6113, respectively, the gas flows through the corresponding intake channel 6115, and is finally converged in the convergence chamber 6114.

In the embodiment, the resonance plate 612 is connected to the second surface 6112 of the inlet plate 611. The resonance plate 612 includes a central aperture 6121, a vibration part 6122 and a fixed part 6123. The central aperture 6121 is located at a center position of the resonance plate 612 and penetrated therethrough. The vibration part 6122 surrounds the central aperture 6121 and is located at a peripheral area around the central aperture 6121. The fixed part 6123 surrounds the vibration part 6122 and is located at the periphery of the vibration part 6122. The resonance plate 612 is connected to the inlet plate 611 through the fixed part 6123. In the embodiment, when the resonance plate 612 is connected to the inlet plate 611, the central aperture 6121 and the vibration part 6122 are vertically corresponding to the convergence chamber 6114 of the inlet plate 611.

In the embodiment, the actuation element 613 is connected to the fixed part 6123 of the resonance plate 612. The actuation element 613 includes a vibration plate 6131, an outer frame 6132, a plurality of connection parts 6133, a piezoelectric plate 6134 and a plurality of gas passages 6135. The vibration plate 6131 is a square structure. The outer frame 6132 is a square frame surrounding the periphery of the vibration plate 6131 and has a first conductive pin 6132a. The first conductive pin 6132a is extended from the periphery of the outer frame 6132 in a horizontal direction. The plurality of gas passages 6135 are formed between the vibration plate 6131, the outer frame 6132 and the plurality of connection parts 6133. In the embodiment, the actuation element 613 is connected to the fixed part 6123 of the resonance plate 612 through the outer frame 6132. In the embodiment, preferably but not exclusively, the number of the plurality of connection parts 6133 is exemplified by four. The plurality of connection parts 6133 are connected between the vibration plate 6131 and the outer frame 6132, respectively, for elastically supporting the vibration plate 6131. The shape and the area of the piezoelectric plate 6134 are corresponding to those of the vibration plate 6131. In this embodiment, the piezoelectric plate 6134 is also a square structure. Preferably but not exclusively, the piezoelectric plate 6134 has a side length less than or equal to that of the vibration plate 6131, and is attached to the vibration plate 6131. In addition, the vibration plate 6131 has two opposite surfaces, which are an upper surface 6131a and a lower surface 6131b. The upper surface 6131a has a convex portion 6131c, and the piezoelectric plate 6134 is attached to the lower surface 6131b.

The profiles of the first insulation frame 614 and the second insulation frame 616 are the same as the outer frame 6132 of the actuation element 613, and both are square frames. The conducting frame 615 includes a frame portion 6151, an electrode portion 6152 and a second conductive pin 6153. The frame portion 6151 has the same shape as the first insulation frame 614 and the second insulation frame 616 and is a square frame. The electrode portion 6152 is extended from the inner side of the frame portion 6151 toward the center, and the second conductive pin 6153 is extended horizontally from the outer periphery of the frame portion 6151. In the embodiment, the first insulation frame 614 is connected to the actuation element 613, the conducting frame 615 is connected to the first insulation frame 614, and the second insulation frame 616 is connected to the conducting frame 615.

Figure 4A:
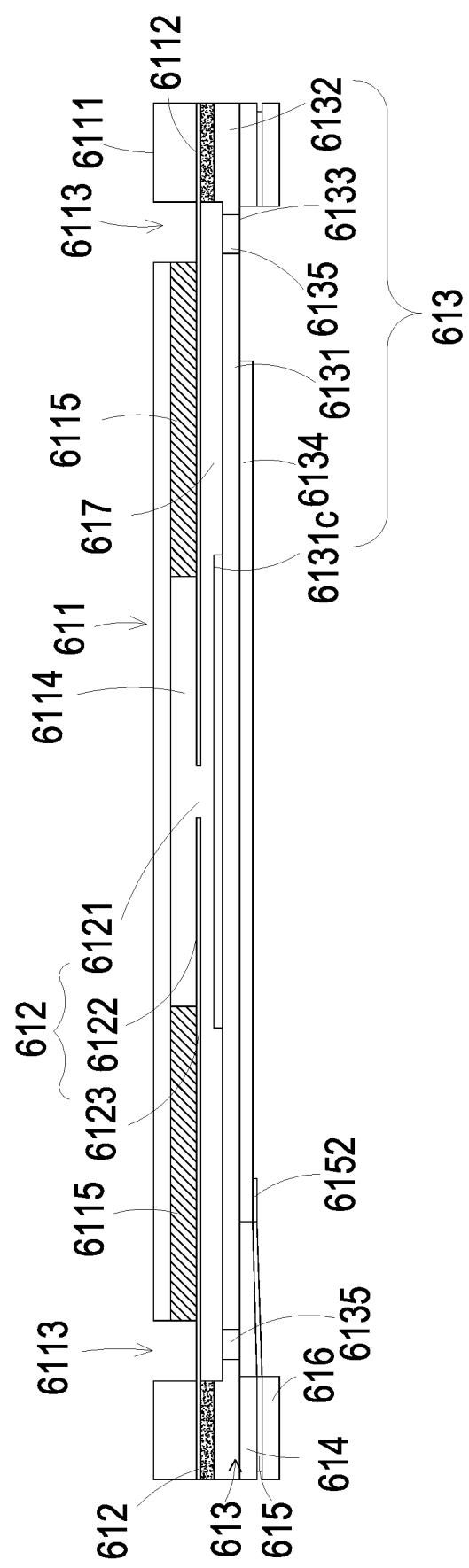
FIG. 4A is a schematic cross-sectional view illustrating the thin gas pump according to the embodiment of the present disclosure.

Please refer to FIGS. 4A and 3A. FIG. 4A is a schematic cross-sectional view illustrating the thin gas pump according to the embodiment of the present disclosure. The inlet plate 611, the resonance plate 612, the actuation element 613, the first insulation frame 614, the conducting frame 615 and the second insulation frame 616 are stacked sequentially, and a vibration chamber 617 is formed between the resonance plate 612 and the vibration plate 6131. In addition, the electrode portion 6152 of the conducting frame 615 is in contact with the piezoelectric plate 6134 of the actuation element 613 and electrically connected therewith, so that the first conductive pin 6132*a* of the actuation element 613 and the second conductive pin 6153 of the conducting frame 615 are externally connected to receive the driving signal, such as the driving voltage and the driving frequency, and transmit the driving signal to the piezoelectric plate 6134. In the embodiment, the first conductive pin 6132*a* and the second conductive pin 6153 are electrically connected with the control chip 3 by the wire bonding method, so as to regulate the thin gas transportation device 6 by the control chip 3.

Figure 4B:
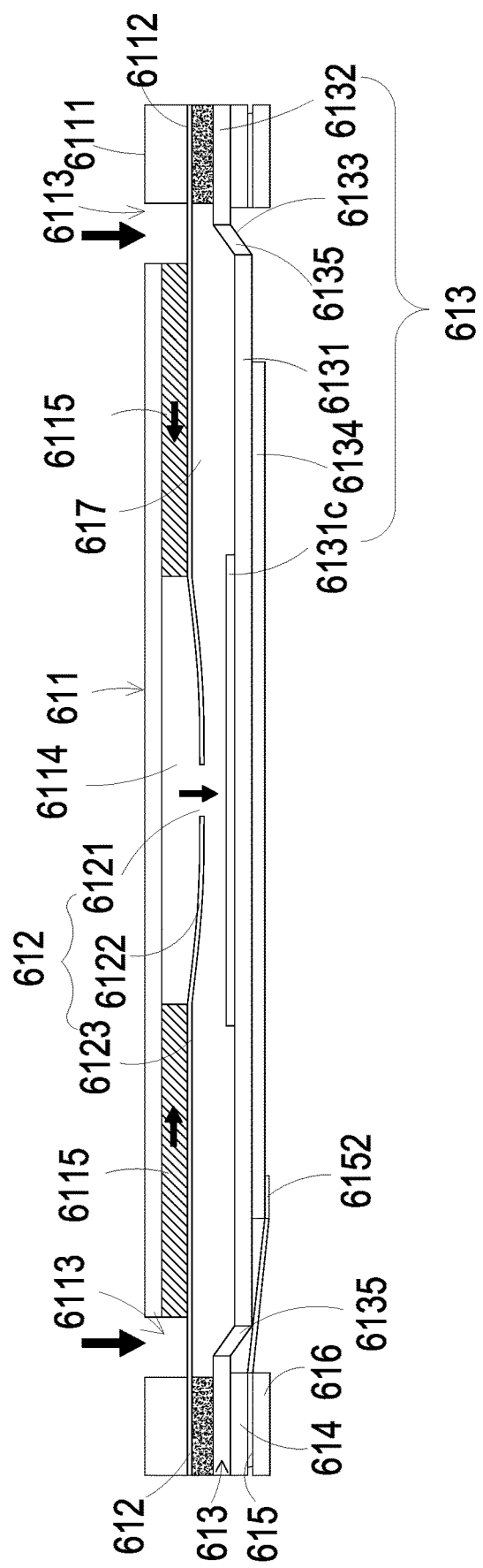
FIGS. 4B to 4D are schematic cross-sectional views illustrating actions of the thin gas pump of the present disclosure.
Figure 4C:
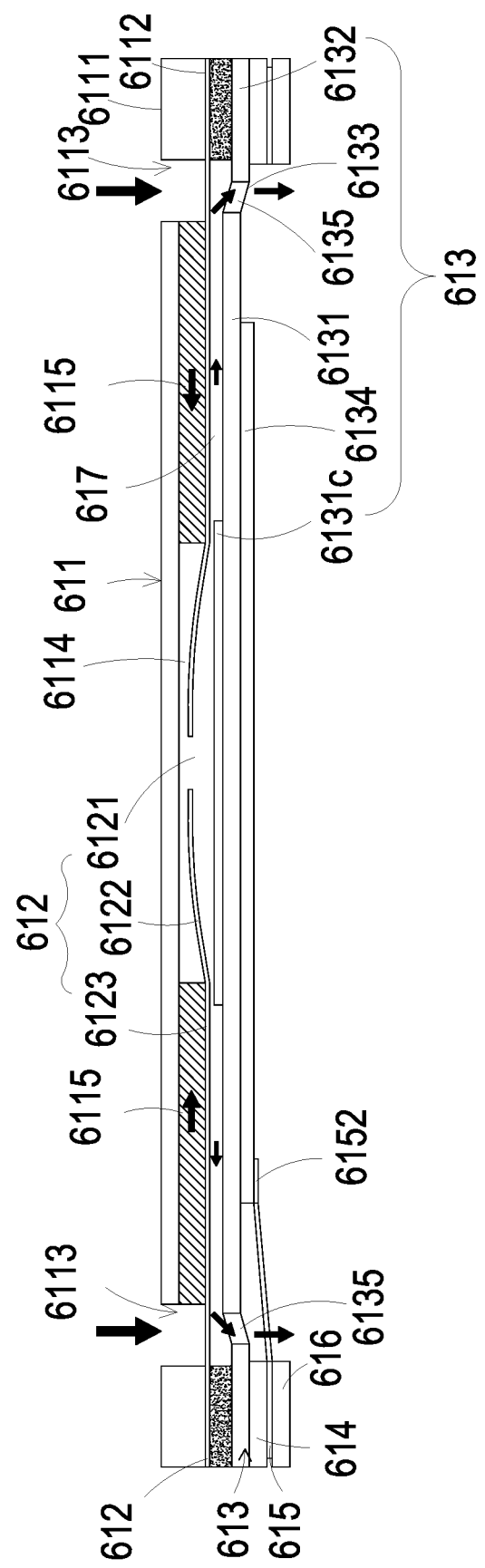
Figure 4D:
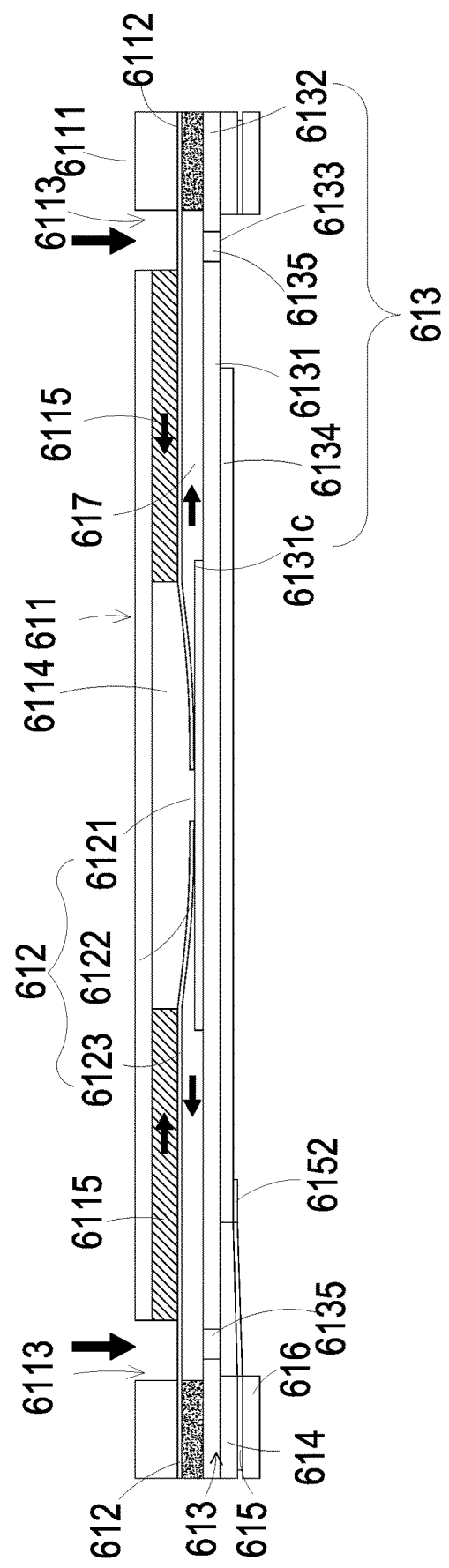

FIGS. 4B to 4D are schematic cross-sectional views illustrating actions of the thin gas pump 61. When the piezoelectric plate 6134 receives the driving signal, the piezoelectric plate 6134 is deformed due to the piezoelectric effect, and the vibration plate 6131 is driven to displace upwardly and downwardly. Please refer to FIG. 4B firstly. When the vibration plate 6131 is displaced downwardly, the vibration part 6122 of the resonance plate 612 is driven to move downwardly, so that the volume of the convergence chamber 6114 is increased, and the gas outside is inhaled into the convergence chamber 6114 through the inlet apertures 6113 and the intake channels 6115. As shown in FIG. 4C, when the vibration plate 6131 is driven to displace upwardly by the piezoelectric plate 6134, the gas in the vibration chamber 617 is pushed from the center to the periphery and transported to the gas passages 6135, so that the gas flows downwardly through the gas passages 6135. At the same time, the resonance plate 612 is moved upwardly, and the gas in the convergence chamber 6114 is transported downwardly through the central aperture 6121. Finally, as shown in FIG. 4D, when the vibration plate 6131 is displaced downwardly and back to the original position, the vibration part 6122 of the resonance plate 612 is driven synchronously to move downwardly, and the vibration part 6122 approaches the convex portion 6131*c* of the vibration plate 6131. In that, the gas in the vibration chamber 617 is transported outwardly to flow through the gas passages 6135. Moreover, since the vibration part 6122 is displaced downwardly, the volume of the convergence chamber 6114 is greatly increased, and then the gas is inhaled from the outside through the inlet apertures 6113 and the intake channels 6115 and flows into the convergence chamber 6114. By repeating the actions shown in the above continuously, the gas is continuously transported downwardly to the thin valve structure 62.

Figure 5A:
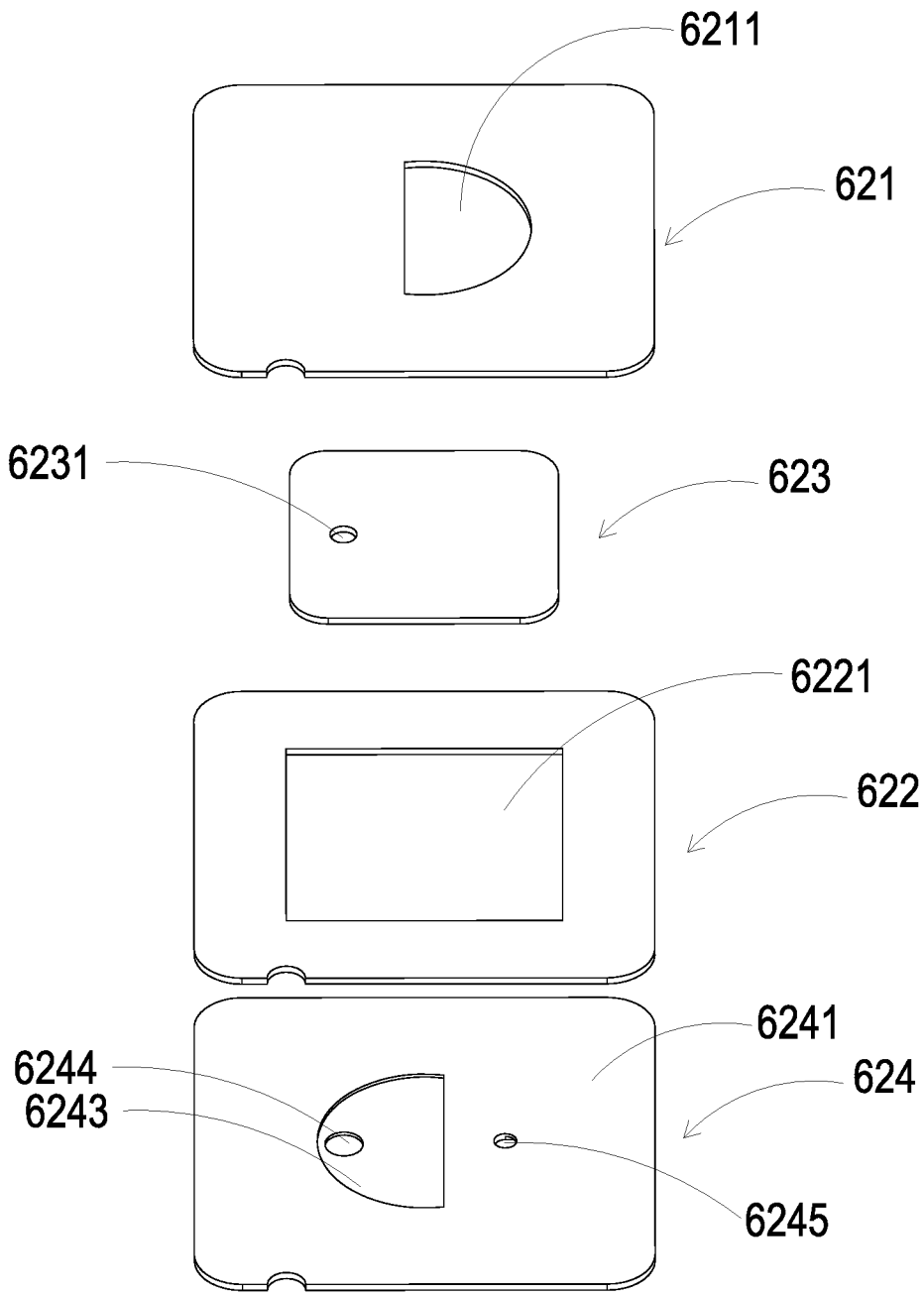
FIG. 5A is an exploded view illustrating the thin valve structure according to the embodiment of the present disclosure.
Figure 5B:
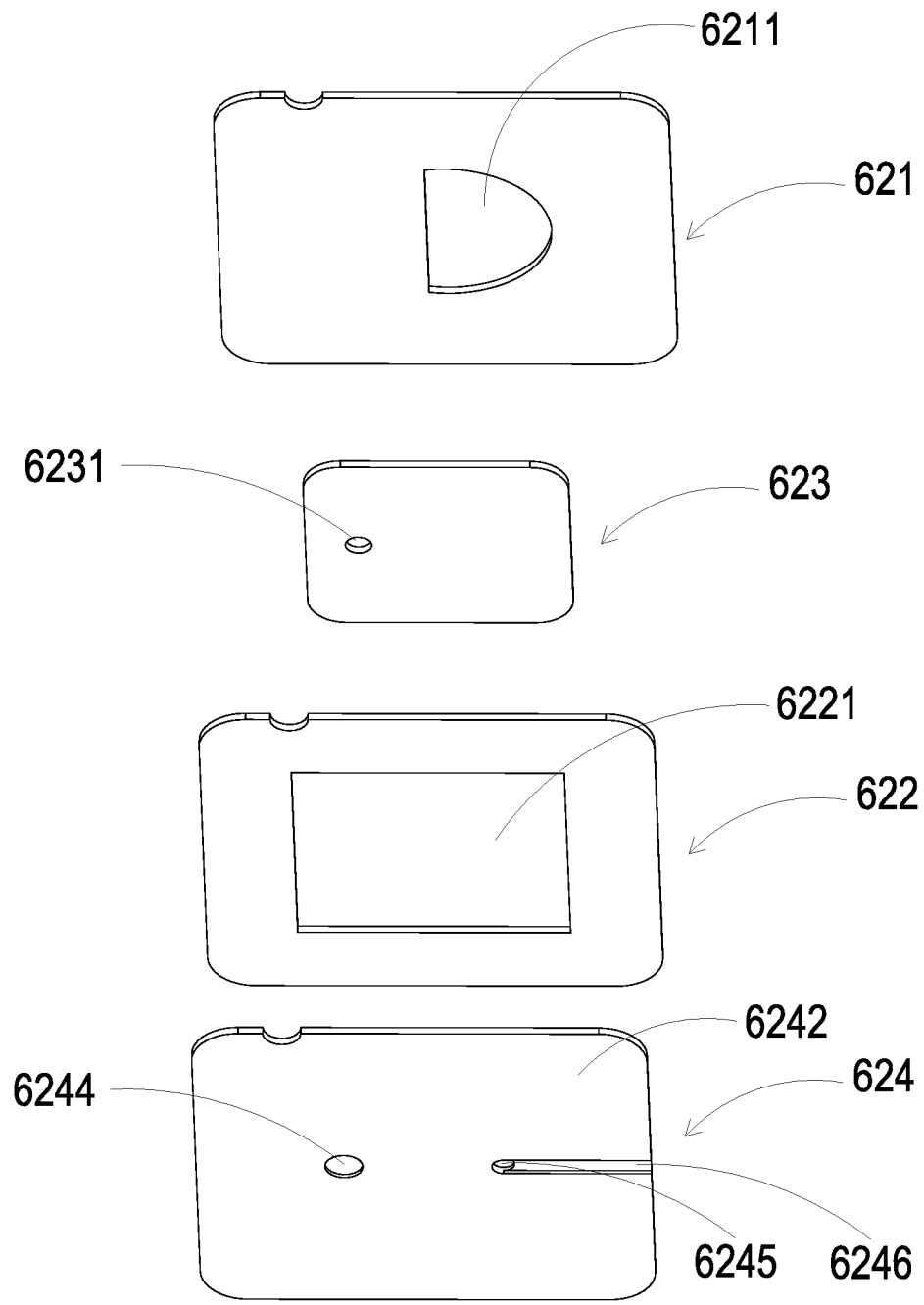
FIG. 5B is an exploded view illustrating the thin valve structure according to the embodiment of the present disclosure and taken from a different perspective.

Please refer to FIGS. 5A to 5B. FIG. 5A is an exploded view illustrating the thin valve structure according to the embodiment of the present disclosure. FIG. 5B is an exploded view illustrating the thin valve structure according to the embodiment of the present disclosure and taken from a different perspective. The thin valve structure 62 includes a first thin plate 621, a valve frame 622, a valve plate 623 and a second thin plate 624.

In the embodiment, the first thin plate 621 includes a hollowed region 6211. The valve frame 622 includes a valve-plate-accommodation region 6221. The valve plate 623 is disposed in the valve-plate-accommodation region 6221 and includes a valve aperture 6231. The valve aperture 6231 is misaligned with the hollowed region 6211. Preferably but not exclusively, the shape of the valve-plate-accommodation region 6221 is the same as the shape of the valve plate 623 for fixing and positioning the valve plate 623.

In the embodiment, the second thin plate 624 includes an outgassing surface 6241, a pressure relief surface 6242, an outlet groove 6243, an outlet aperture 6244, a pressure relief aperture 6245 and a pressure relief groove 6246. The outgassing surface 6241 and the pressure relief surface 6242 are two surfaces opposed to each other. The outlet groove 6243 is recessed from the outgassing surface 6241 and partially misaligned with the hollowed region 6211 of the first thin plate 621. The outlet aperture 6244 is hollowed out from the outlet groove 6243 toward the pressure relief surface 6242. The outlet aperture 6244 is corresponding in position to the valve aperture 6231 of the valve plate 623. In addition, the outlet aperture 6244 has a diameter greater than that of the valve aperture 6231. The pressure relief aperture 6245 is spaced apart from the outlet groove 6243. The pressure relief groove 6246 is recessed from the pressure relief surface 6242 and includes an end in fluid communication with the pressure relief aperture 6245 and another end extended to the edge of the second thin plate 624. In the embodiment, preferably but not exclusively, the outlet groove 6243 of the second thin plate 624 and the hollowed region 6211 of the first thin plate 621 are in an identical shape and corresponding to each other.

In the embodiment, the first thin plate 621, the valve frame 622 and the second thin plate 624 are made of a metal material. In an embodiment, preferably but not exclusively, the first thin plate 621, the valve frame 622 and the second thin plate 624 are made of the same metal material, such as the stainless steel material.

Figure 6A:
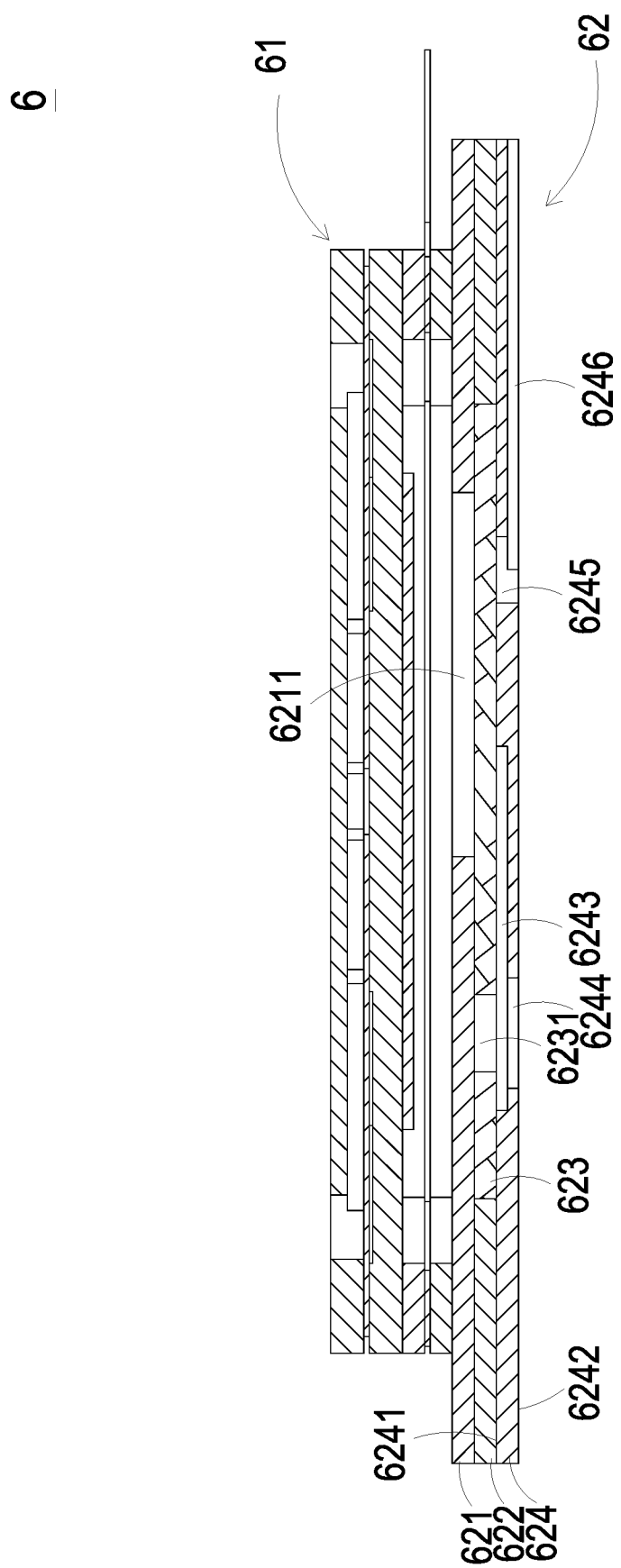
FIG. 6A is a schematic cross-sectional view illustrating the thin gas transportation device according to the embodiment of the present disclosure.
Figure 6B:
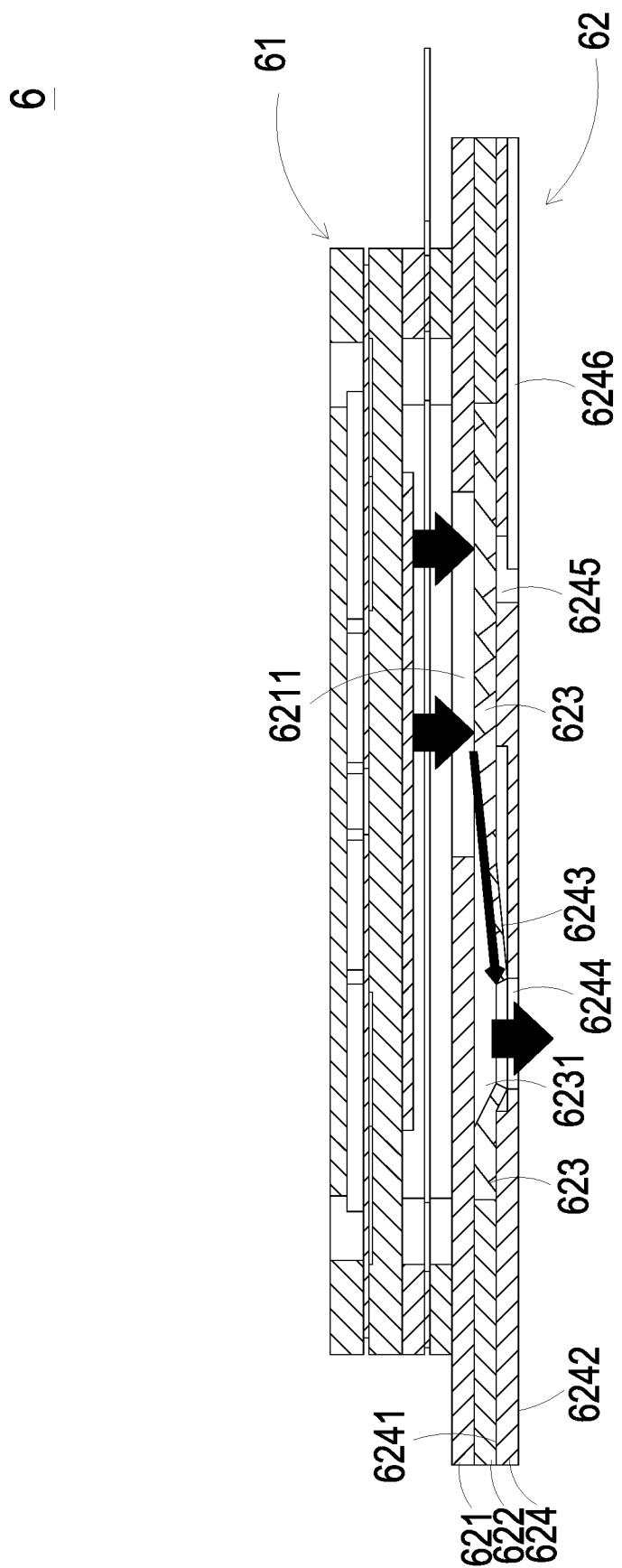
FIG. 6B is a schematic cross-sectional view illustrating a gas discharging action of the thin gas transportation device according to the embodiment of the present disclosure.
Figure 6C:
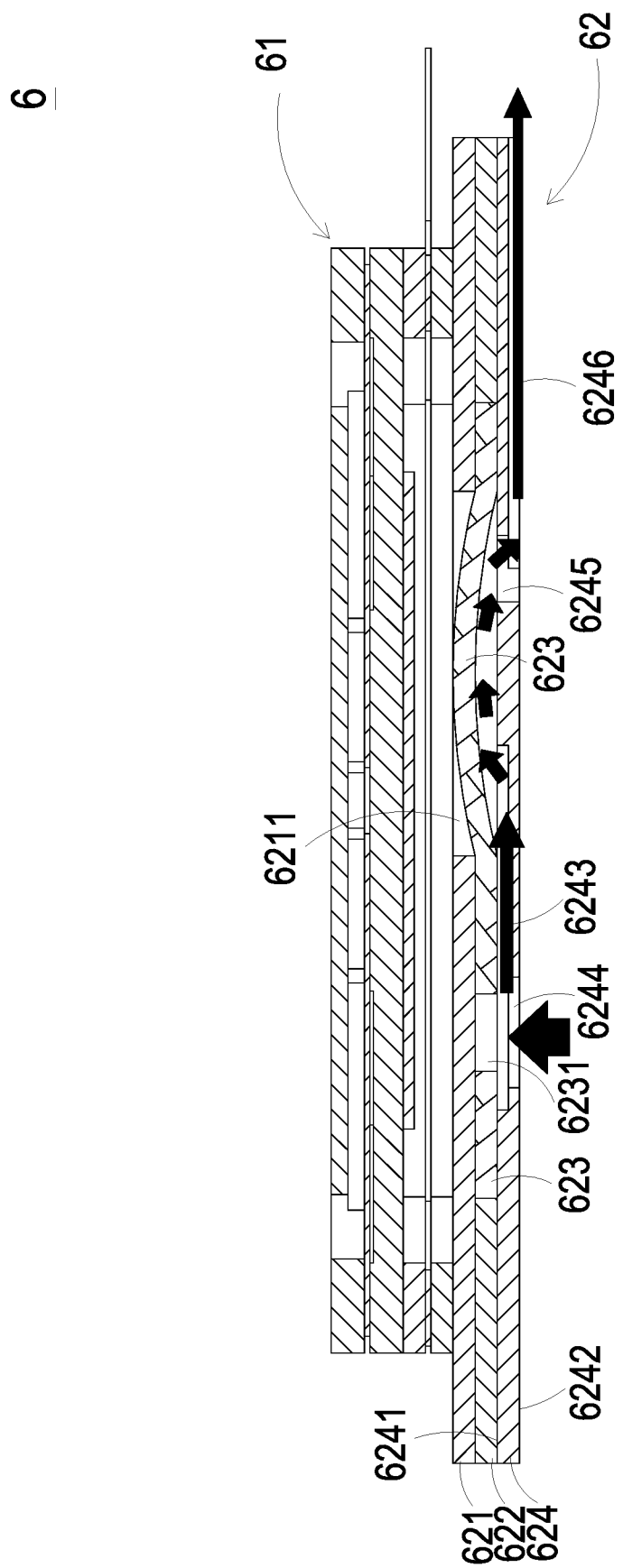
FIG. 6C is a schematic cross-sectional view illustrating a pressure relief action of the thin gas transportation device according to the embodiment of the present disclosure.

Please refer to FIG. 6A. FIG. 6A is a schematic cross-sectional view illustrating the thin gas transportation device according to the embodiment of the present disclosure. The first thin plate 621, the valve frame 622 and the second thin plate 624 of the thin valve structure 62 are stacked and fixed sequentially. The valve plate 623 is accommodated within the valve-plate-accommodation region 6221 of the valve frame 622. The thin valve structure 62 is connected to the second insulation frame 616, so that the thin gas pump 61 is stacked on the thin valve structure 62. When the gas is transported to the thin valve structure 62 by the thin gas pump 61, as shown in FIG. 6B, the gas flows into the hollowed region 6211 of the first thin plate 621 to push the valve plate 623. In that, a part of the valve plate 623 located above the outlet groove 6243 is pushed downwardly, and the gas flows into the outlet groove 6243, and is discharged through the valve aperture 6231 and the outlet aperture 6244 of the second thin plate 624. FIG. 6C is a schematic cross-sectional view illustrating the thin valve structure 62 performing the pressure relief action. When the thin gas transportation device 6 stops transporting the gas, the pressure relief action starts through the thin valve structure 62. As shown in FIG. 6C, the gas is transported from the outlet aperture 6244 to the second thin plate 624, and pushes the valve plate 623 upwardly at the same time. In that, the valve aperture 6231 of the valve plate 623 abuts and seals against the first thin plate 621. Moreover, one part of the valve plate 623 located above the hollowed region 6211 of the first thin plate 621 is pushed upwardly, and the gas flows from the outlet groove 6243 into the hollowed region 6211. The gas is discharged through the pressure relief aperture 6245 and the pressure relief groove 6246 to achieve the pressure relief action.

Figure 7A:
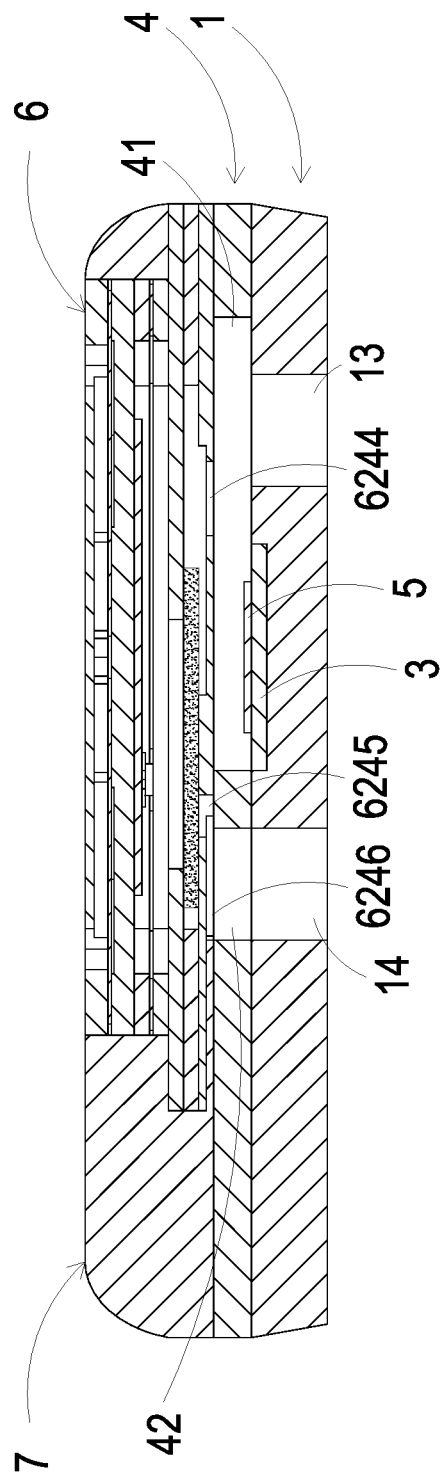
FIG. 7A is a schematic cross-sectional view illustrating the actuating and sensing module according to the embodiment of the present disclosure.
Figure 7B:
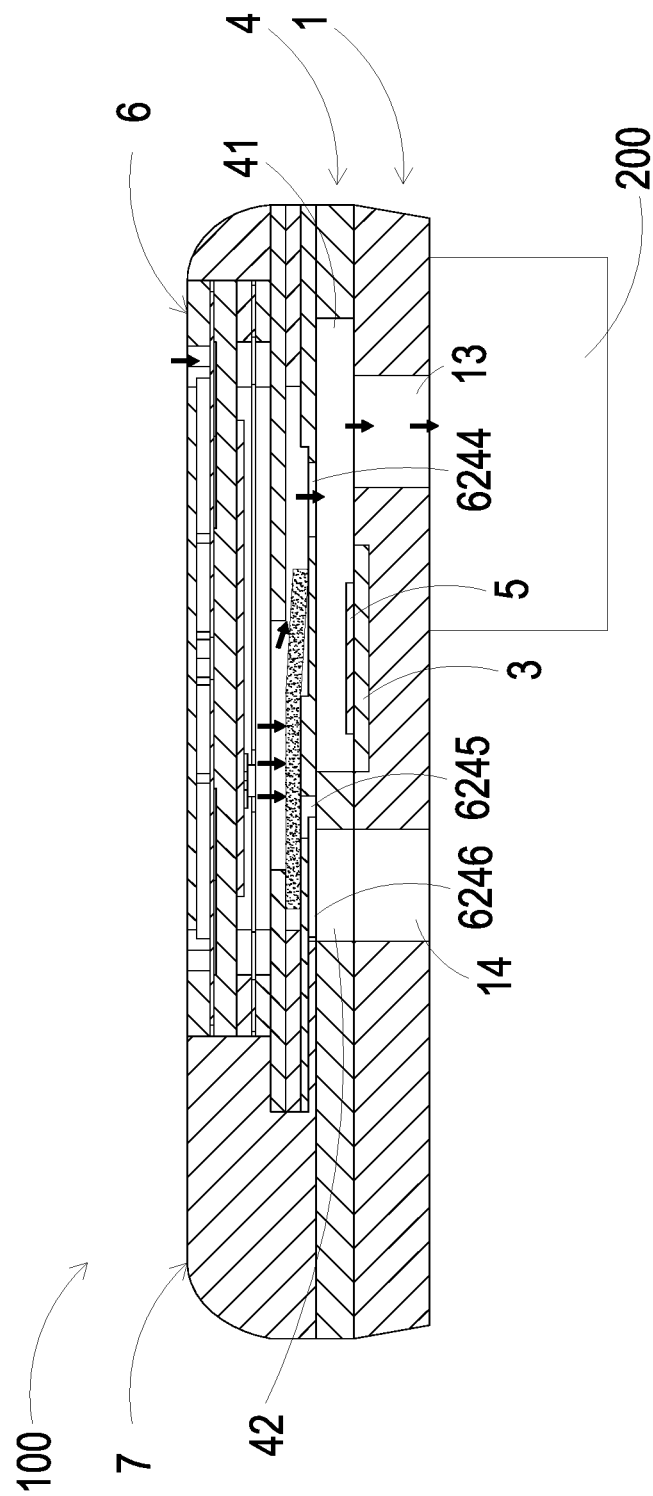
FIG. 7B is a schematic cross-sectional view illustrating an inflation of the actuating and sensing module connected with a positive pressure load according to the embodiment of the present disclosure.
Figure 7C:
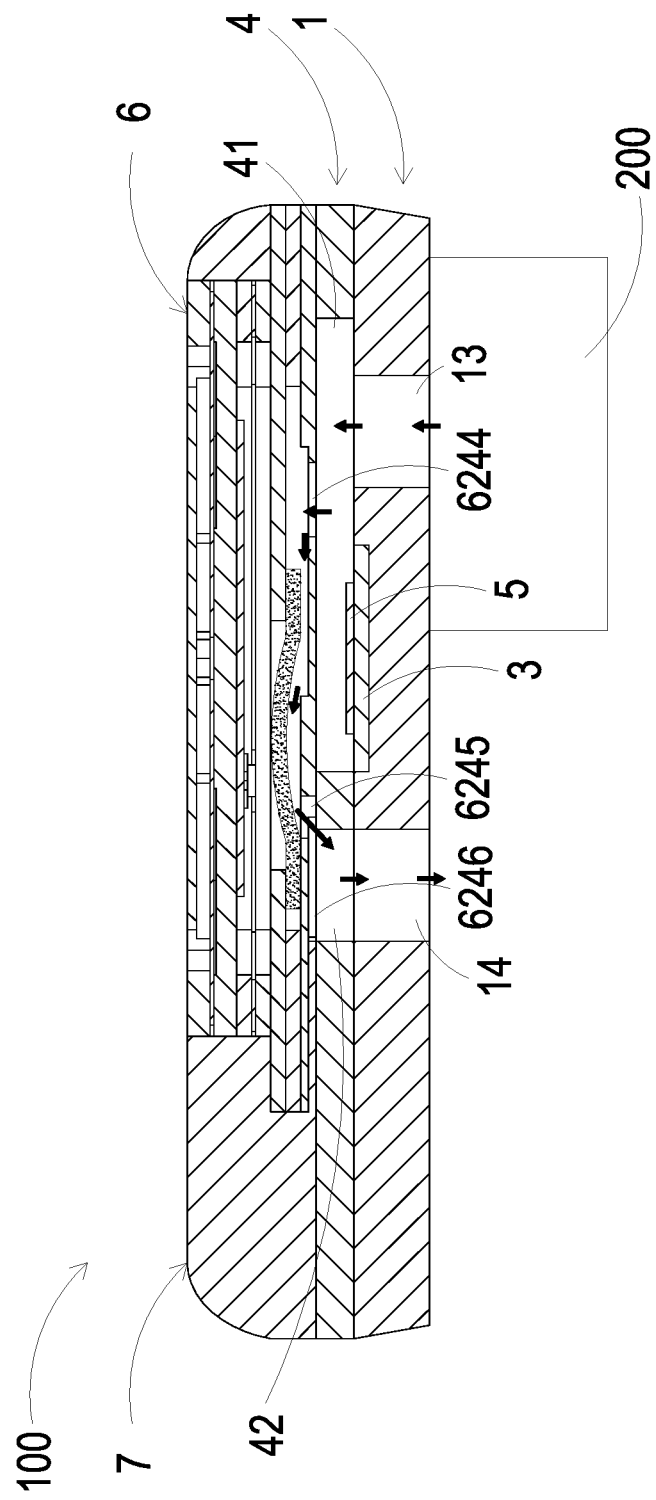
FIG. 7C is a schematic cross-sectional view illustrating a pressure relief action of the actuating and sensing module connected with a positive pressure load according to the embodiment of the present disclosure.

Please refer to FIG. 7A. In the embodiment, the outlet aperture 6244 of the thin gas transportation device 6 is in fluid communication with the gas outlet 13 of the bottom plate 1 through the outlet opening 41 of the partition plate 4. Moreover, the pressure relief aperture 6245 is in fluid communication with the gas relief aperture 14 of the bottom plate 1 through the pressure relief orifice 42 of the partition plate 4. Please refer to FIG. 7B. Notably, in the embodiment, the actuating and sensing module 100 of the present disclosure is connected with a positive pressure load 200. The positive pressure load 200 is in fluid communication with the gas outlet 13 of the bottom plate 1. When the thin gas transportation device 6 is actuated, the gas is transported to the positive pressure load 200, so as to inflate the positive pressure load 200. The pressure value and the flow rate of the gas transported to the positive pressure load 200 is obtained from the gas pressure sensor 5 in the outlet opening 41, so as to regulate the thin gas transportation device 6. Please refer to FIG. 7C again. When the positive pressure load 200 needs to perform the pressure relief action, the thin gas transportation device 6 stops the operation thereof, the thin valve structure 62 thereof performs the pressure relief action, and the gas is discharged through the gas relief aperture 14.

Figure 7D:
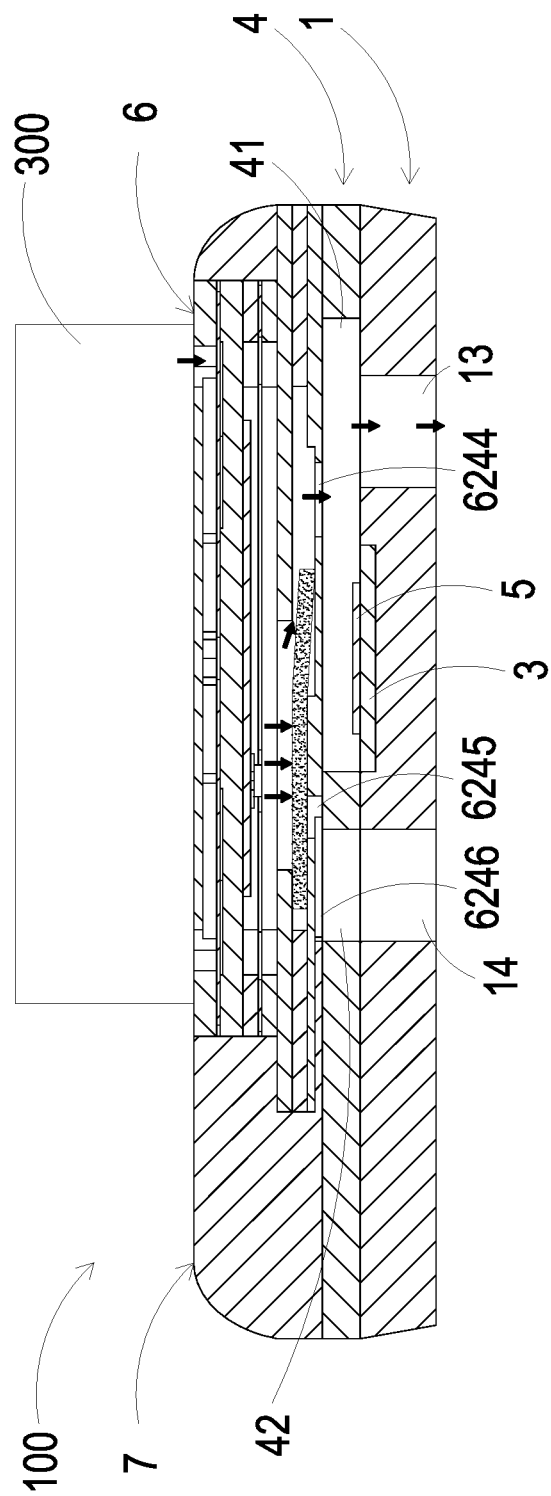
FIG. 7D is a schematic cross-sectional view illustrating an inflation of the actuating and sensing module connected with a negative pressure load according to the embodiment of the present disclosure.
Figure 7E:
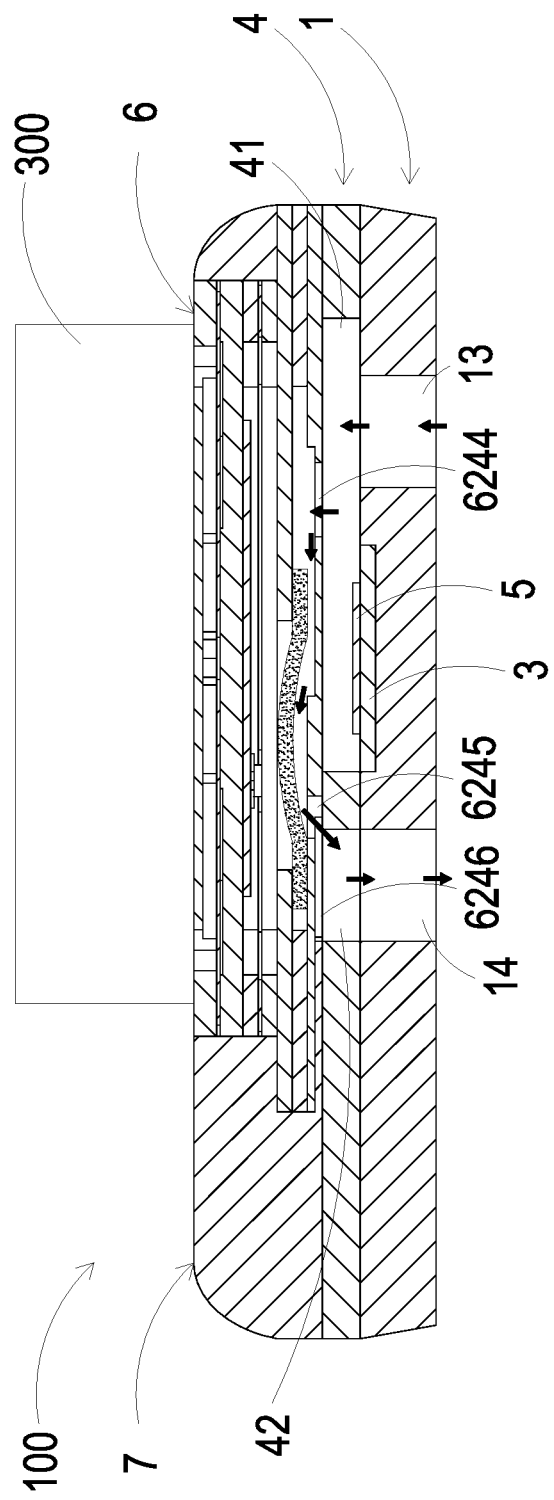
FIG. 7E is a schematic cross-sectional view illustrating a pressure relief action of the actuating and sensing module connected with a negative pressure load according to the embodiment of the present disclosure.

Please refer to FIG. 7D. In the embodiment, the actuating and sensing module 100 of the present disclosure is connected with a negative pressure load 300, and the negative pressure load 300 is in fluid communication with the inlet apertures 6113 of the thin gas transportation device 6. When the thin gas transportation device 6 is actuated, the gas is inhaled from the negative pressure load 300, and then discharged through the gas outlet 13. The gas flowing into the actuating and sensing module 100 is sensed to obtain the gas pressure value and the flow rate by the gas pressure sensor 5, so as to regulate the thin gas transportation device 6. Moreover, when the thin gas transportation device 6 stop running, as shown in FIG. 7E, the pressure relief action is performed through the thin valve structure 62 and prevents the gas backflow.

In the embodiment, the positive pressure load 200 and the negative pressure load 300 are one selected form the group consisting of an air bag, a gas bag, a gas cylinder and a gas tank, which can be filled with gas.

In the embodiment, preferably but not exclusively, the actuating and sensing module 100 of the present disclosure is a standard modular IC. In an embodiment, the bottom plate 1, the partition plate 4 and the cover plate 7 can be used as the housing of the IC-package, and the thin gas transportation device 6 is embedded therein as the IC is packaged. Notably, in the embodiment, preferably but not exclusively, the actuating and sensing module 100 of the present disclosure is an IC chip, which has a length less than 20 mm, a width less than 18 mm, and a thickness less than 5 mm.

In summary, the present disclosure provides an actuating and sensing module, which is applicable for a positive pressure load or a negative pressure load, such as an air bag or a gas cylinder. The positive pressure load and the negative pressure load can be detected by the gas pressure sensor to further regulate the thin gas transportation device. Notably, the thin gas transportation device of the actuating and sensing module is embedded in the IC packaged structure, so that the IC packaged structure has a function of gas transporting. In addition, a heat exchange occurs between the control chip and the gas transported through the outlet opening, so as to achieve the effect of dissipating the heat.

While the disclosure has been described in terms of the most practical and preferred embodiments, it is to be understood that the disclosure needs not be limited to the disclosed embodiments. On the contrary, it is intended to cover various modifications and similar arrangements included within the spirit and scope of the appended claims so as to encompass all such modifications and similar structures.

What is claimed is:

1. An actuating and sensing module comprising:
   a bottom plate comprising at least one terminal groove, a recess, a gas outlet and a gas relief aperture;
   at least one terminal disposed in the at least one terminal groove;
   a control chip disposed in the recess;
   a partition plate stacked on the bottom plate and comprising an outlet opening and a pressure relief orifice, wherein the outlet opening is in fluid communication with the gas outlet, and the pressure relief orifice is corresponding to the gas relief aperture;
   a gas pressure sensor accommodated in the outlet opening;
   a thin gas transportation device disposed on the partition plate and sealing the gas outlet and the pressure relief orifice; and
   a cover plate disposed on the partition plate and comprising an opening, wherein the thin gas transportation device passes through the opening;
   wherein a gas is transported to the outlet opening by the thin gas transportation device, and a change of pressure and flow rate of the gas is sensed by the gas pressure sensor disposed in the outlet opening.

2. The actuating and sensing module according to claim 1, wherein the gas pressure sensor is located above the control chip.

3. The actuating and sensing module according to claim 1, wherein the gas outlet is in fluid communication with a positive pressure load.

4. The actuating and sensing module according to claim 3, wherein the positive pressure load is an air bag.

5. The actuating and sensing module according to claim 3, wherein the positive pressure load is a gas cylinder.

6. The actuating and sensing module according to claim 1, wherein the thin gas transportation device is in fluid communication with a negative pressure load.

7. The actuating and sensing module according to claim 6, wherein the negative pressure load is an air bag.

8. The actuating and sensing module according to claim 6, wherein the negative pressure load is a gas cylinder.

9. The actuating and sensing module according to claim 1, wherein the thin gas transportation device comprises:
   a thin gas pump comprising:
      an inlet plate comprising a first surface, a second surface opposed to the first surface, a plurality of inlet apertures, a plurality of intake channels and a convergence chamber, wherein each one of the plurality of inlet apertures penetrates from the first surface to the second surface, and the convergence chamber is recessed from the second surface and located at a center of the second surface, wherein each of the plurality of intake channels is recessed from the second surface and comprises a first end in fluid communication with the corresponding inlet aperture and a second end in fluid communication with the convergence chamber;

a resonance plate connected to the second surface and comprising a central aperture, a vibration part and a fixed part, wherein the central aperture is located at a center position of the resonance plate, the vibration part surrounds the central aperture and corresponds to the convergence chamber, and the fixed part surrounds the vibration part, wherein the resonance plate is connected to the inlet plate through the fixed part;

an actuation element connected to the fixed part of the resonance plate;

a first insulation frame connected to the actuation element;

a conducting frame connected to the first insulation frame; and a second insulation frame connected to the conducting frame; and a thin valve structure connected to the second insulation frame and comprising:

a first thin plate comprising a hollowed region;

a valve frame comprising a valve-plate-accommodation region;

a valve plate disposed in the valve-plate-accommodation region and comprising a valve aperture, wherein the valve aperture is misaligned with the hollowed region; and a second thin plate comprising an outgassing surface, a pressure relief surface opposed to the outgassing surface, an outlet groove, an outlet aperture, a pressure relief aperture and a pressure relief groove, wherein the outlet groove is recessed from the outgassing surface and partially misaligned with the hollowed region of the first thin plate, the outlet aperture is hollowed out from the outlet groove toward the pressure relief surface and is corresponding to the valve aperture, the pressure relief aperture is spaced apart from the outlet groove, and the pressure relief groove is recessed from the pressure relief surface and in fluid communication with the pressure relief aperture;

wherein the first thin plate, the valve plate and the second thin plate are stacked and fixed sequentially.

10. The actuating and sensing module according to claim 9, wherein the actuation element comprises:

a vibration plate being a square structure;

an outer frame arranged around the vibration plate;

a plurality of connection parts connected between the vibration plate and the outer frame, respectively, for elastically supporting the vibration plate; and a piezoelectric plate with a shape and an area corresponding to the vibration plate and attached to the vibration plate.

11. The actuating and sensing module according to claim 9, wherein the outlet aperture has a diameter greater than a diameter of the valve aperture.

12. The actuating and sensing module according to claim 9, wherein the first thin plate, the valve frame and the second thin plate are made of a metal material.

13. The actuating and sensing module according to claim 12, wherein the metal material is a stainless steel material.

14. The actuating and sensing module according to claim 9, wherein the hollowed region and the outlet groove have an identical shape.

15. The actuating and sensing module according to claim 9, wherein the actuating and sensing module has a length less than 20 mm, a width less than 18 mm, and a thickness less than 5 mm.

* * * * *